US006723247B2

(12) United States Patent
Martin

(10) Patent No.: US 6,723,247 B2

(45) Date of Patent: Apr. 20, 2004

(54) METHOD FOR PROCESSING A COLOR REVERSAL PHOTOGRAPHIC FILM

(75) Inventor: Didier J. Martin, Givry (FR)

(73) Assignee: Eastman Kodak Company, Rochester, NY (US)

(*) Notice: Subject to any disclaimer, the term of this patent is extended or adjusted under 35 U.S.C. 154(b) by 162 days.

(21) Appl. No.: 10/123,714

(22) Filed: Apr. 16, 2002

(65) Prior Publication Data

US 2003/0070987 A1 Apr. 17, 2003

(30) Foreign Application Priority Data

May 15, 2001 (FR) ........................................... 01 06331

(51) Int. Cl.[7] ............................................... B01D 61/00

(52) U.S. Cl. ........................ 210/652; 210/651; 210/653; 430/398; 430/399; 430/400; 430/428

(58) Field of Search ................................ 210/651, 652, 210/653; 430/398–400, 428; 396/565, 630; 136/64 P

(56) References Cited

U.S. PATENT DOCUMENTS

| | | | | | |
|---|---|---|---|---|---|
| 4,804,616 | A | | 2/1989 | Ueda et al. | |
| 5,607,592 | A | * | 3/1997 | Bernard et al. | 210/641 |
| 5,658,715 | A | | 8/1997 | Nakamura et al. | |
| 5,678,112 | A | * | 10/1997 | Bernard et al. | 396/565 |
| 5,753,424 | A | * | 5/1998 | Ishikawa | 430/463 |
| 5,998,108 | A | * | 12/1999 | Martin | 430/398 |
| 6,117,315 | A | | 9/2000 | Masson | |
| 6,451,518 | B2 | * | 9/2002 | Martin et al. | 430/379 |
| 6,638,699 | B2 | * | 10/2003 | Martin | 430/398 |

FOREIGN PATENT DOCUMENTS

| | | |
|---|---|---|
| EP | 0 772 085 A2 | 5/1997 |
| EP | 0 930 535 A1 | 7/1999 |
| FR | 2 786 280 | 5/2000 |

* cited by examiner

*Primary Examiner*—Ana Fortuna

(57) ABSTRACT

The invention relates to a low-water-consumption method for processing an exposed color reversal photographic film. This method comprises the circulation of this exposed film in:

i) a black and white development bath, ii) a first washing bath, iii) a reversal bath comprising at least a buffer agent liable to pass through a nanofiltration membrane and, in addition, the collection of waters leaving the said reversal bath, the circulation of these waters through a nanofiltration device to produce a permeate that is recycled in the said first washing bath, a water volume at least equivalent to that supplied by the said permeate being rejected via the overflow and the said buffer agent being chosen so as to keep the pH in the first washing bath between 5 and 7.

6 Claims, 1 Drawing Sheet

METHOD FOR PROCESSING A COLOR REVERSAL PHOTOGRAPHIC FILM

FIELD OF THE INVENTION

The present invention relates to a low-water-consumption method for processing an exposed color reversal photographic film. Conventionally, the processing of a color reversal material comprises first a black and white development step, a first washing step, a reversal step, and a color development step.

BACKGROUND OF THE INVENTION

In the conventional processing of color reversal films, the reversal step between the black and white development step and the color development step is conducted either chemically (by a chemical agent) or by fogging. In the reversal step, the silver halides not initially exposed are rendered developable. Such a processing method of color reversal films is well known and described in detail in "Chimie et Physique Photographiques", Volume 2, P Glafkides, 5th edition, Chapter XL, pages 947–967.

One example of such a color reversal processing is the Ektachrome E-6® processing described on page 954 of the above mentioned handbook. During the Ektachrome E-6® photographic processing, the photographic material is successively circulated through each of the following baths:

a) a black and white development bath, b) a first washing bath, c) a chemical reversal bath, d) a color development bath, e) a conditioning bath, f) a bleaching bath, g) a fixing bath, h) one or more washing baths, and i) a rinsing bath.

Then, one proceeds to a drying step.

In general, it is desired that photographic materials be developed automatically and as fast as possible. Now during the circulation of the photographic material from bath to bath, chemical components are carried from one bath to another either by means of the photographic material, or by the conveyor belts of the photographic processor. These chemical components accumulate in the processing baths whose efficiency they reduce. The carry-over of these chemical components gets more significant as the processing of the photographic materials gets faster.

In order to minimize the contamination of the baths by these chemical components, a replenishment solution can be used. In particular, for the reversal bath, the replenishment solution is introduced in the spent bath to be replenished, and an equivalent volume of the spent bath is rejected via the overflow. A spent bath is a bath that is no longer usable photographically. This method generates a significant volume of spent baths, thus a significant volume of effluents.

Another method to minimize the carry-over of chemical components consists in replenishing the washing baths by the continuous addition of clean water in order to maintain a very low concentration of chemical products in these washing baths. This is the reason why a first washing bath is placed between the first black and white development bath and the chemical reversal bath. This first washing bath interrupts the chemical reactions caused by the components of the first development bath, prevent the migration by carry-over from the first developer into the reversal bath and thus prevent deterioration of the quality of the image of the developed film. In Ektachrome E-6® standard processing, it is usual, for washing baths, to use a continuous water supply that can reach a flow rate of 7.5 liters per minute. Such a method results in considerable water consumption, which increases the cost of the processing. In addition, processing laboratories must now satisfy certain regulations that very clearly restrict water consumption per square meter of developed films. However, when the water supply to the first washing bath is reduced, a rise of this bath's pH and a deterioration of the sensitometry of the developed films are observed.

SUMMARY OF THE INVENTION

The present invention provides a method for processing color reversal photographic film that enables significant reduction of the water consumption of the first washing bath situated between the black and white development bath and the chemical reversal bath, while keeping the pH of this first washing bath between 5 and 7, and without deterioration of the sensitometric characteristics of developed films. The invention further provides a photographic processing method that reduces the volume of the spent solution leaving the reversal bath.

The method of the invention for processing an exposed color reversal photographic film comprises the steps of circulating the exposed film in:

i) a black and white development bath, ii) a first washing bath, iii) a chemical reversal bath comprising at least a buffer agent capable to pass through a nanofiltration membrane, this method comprising further the steps of collecting the waters leaving the reversal bath (by overflow and/or by draining), circulating the collected waters through a nanofiltration unit to produce a permeate, recycling the permeate in the first washing bath and rejecting via an overflow a water volume at least equivalent to that supplied by the permeate, the buffer agent being chosen so as to keep the pH in the first washing bath between 5 and 7.

DETAILED DESCRIPTION OF THE INVENTION

Figure 1:
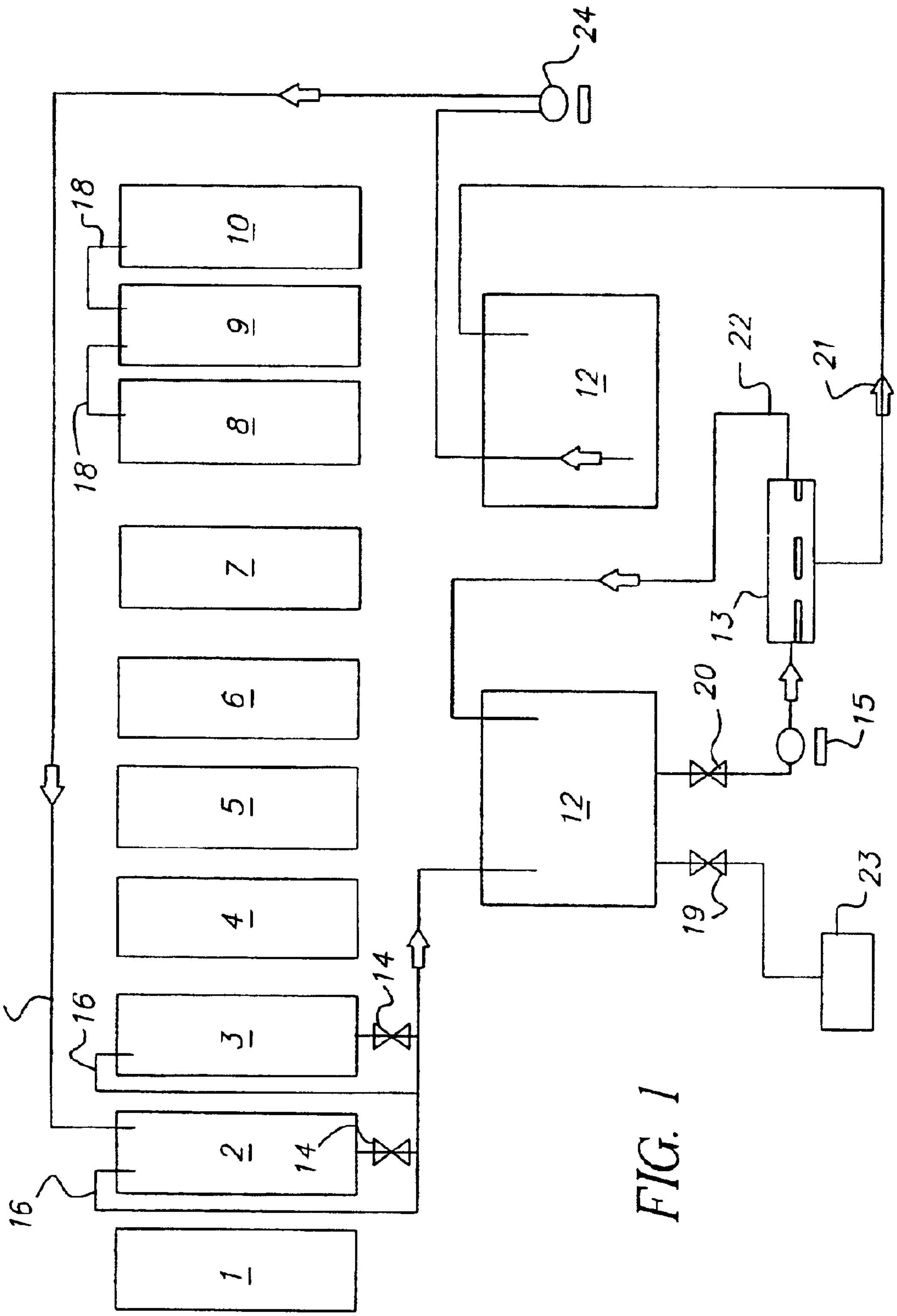
FIG. 1 is a schematic diagram of a device to implement the method of the invention for processing a color reversal photographic film.

In the method according to the invention, the waters of the reversal bath as well as the buffer agent are passed through a nanofiltration unit and recycled in the first washing bath.

According to one embodiment, the reversal bath comprises a tin salt (II).

According to a preferred embodiment, the method of the invention comprises further the step of collecting the waters leaving the reversal bath and the first washing bath (via overflow and/or draining), passing these waters through the nanofiltration unit to produce a permeate, recycling this permeate in the first washing bath and rejecting via an overflow of a volume of water at least equivalent to that supplied by the said permeate, the buffer agent being chosen so as to keep the pH in the first washing bath between 5 and 7.

According to another embodiment, the method comprises the steps of:

a) circulating an exposed color reversal photographic film in successively:

i) a black and white development bath,
ii) a first washing bath,
iii) a reversal bath comprising at least a buffer agent liable to pass through a nanofiltration membrane,
iv) a color development bath,
v) a bleaching bath,
vi) a fixing bath,
vii) a rinsing bath,
viii) a final washing zone comprising at least one washing bath, b) collecting the waters leaving the reversal bath (via overflow and/or draining) in a tank and passing these waters through a nanofiltration unit, and c) recycling the permeate leaving the said nanofiltration device either in an auxiliary source of water supply for the first washing bath, or directly in the first washing bath, a water volume at least equivalent to that supplied by the said permeate being rejected by overflow, the buffer agent being chosen so as to keep a pH between 5 and 7 in the first washing bath.

One requirement to maintain the desired sensitometric characteristics of the developed films is to keep the pH of the first washing bath between 5 and 7. Because of the carry-over of quantities of chemical components from one tank to another either by means of the photographic material, or by conveyor belts of the processor, conventional ingredients of the black and white developer such as, for example, Metol, hydroquinone, phenidone, potassium monosulfonate hydroquinone (KHQS), 4-(hydroxymethyl)-4-methyl-1-phenyl-3-pyrazolidone (HMMP), carbonate ions and the reaction products of these ingredients can be found in the first washing bath. These components contribute to the rise of pH in this first washing bath. To remedy this problem, the buffer agent for the reversal bath is chosen so that it can pass through a nanofiltration membrane and produce a buffer effect in the pH range required (between 5 and 7) in the first washing bath. To go through a nanofiltration membrane, the buffer 9 Of agents are not chosen from among multivalent salts and their molecular weights are less than the nanofiltration membrane's cut-off threshold. The nanofiltration membrane's cut-off threshold is the molecular weight of the smallest chemical entity selected by the membrane for a retention rate of 0.9. The retention rate (TR) for a membrane is defined by the equation:

$$TR=1-(Cp/Cr)$$

where Cr is the concentration of the species to be retained in the retentate and Cp is the concentration of the same species in the permeate. The buffer agent satisfying these conditions can be made up of a monovalent salt of a weak acid and its conjugated base, having molecular weights less than the nanofiltration membrane's cut-off threshold. Examples of buffer agents that are useful according to the invention for reversal baths, are the pairs, acetic acid/sodium acetate and propionic acid/sodium propionate. The buffer agent (weak acid/conjugated base pair) can also be generated in situ by the addition of a base (generally an alkali such as sodium hydroxide) to a weak acid to generate a mixture comprising the weak acid and its conjugated base. Preferentially, to obtain optimum efficiency of the buffer agent, an equimolar mixture of the weak acid and its conjugated base is prepared.

Usually, the reversal step is carried out with a chemical agent. A great variety of chemical reducing agents have been proposed in the literature for this purpose, such as thioureas, aminoboranes and stannous (Sn-II) compounds. Stannous compounds such as salts, or complexes are generally preferred, as described in Research Disclosure, July 1978, No 17156, A New Reversal Bath for Processing Color Reversal Materials, or in U.S. Pat. No. 3,617,282; German patent application 2,744,356; Japanese patent applications 79-137904 or 79-014289.

The nanofiltration unit used according to the invention separates dissolved substances or chemical products based on diluted solutions. Nanofiltration is a technique used to selectively separate salts and organic compounds in solution. Membranes used for nanofiltration thus behave like large surface area sieves having pores of microscopic or molecular size whose dimensions must be very even in order that molecules of a defined size are retained while smaller molecules or ions of simple salts go through the membrane. Membranes for nanofiltration generally let through molecules whose molecular weight is between 100 and 1000 daltons. Multivalent ionized salts and non-ionized organic compounds with molar molecular weight than 1000 daltons are, however, strongly retained. The solution that has crossed the membrane is called filtrate or permeate and the solution that is retained by the membrane is called concentrate or retentate. Nanofiltration membranes can be inorganic or organic. Organic membranes are membranes based on cellulose acetate, poly(amide/imide), polysulfone, acrylic polymers or fluoropolymers. Inorganic membranes are membranes based on carbon, ceramics, anodized aluminum, sintered metal or porous glass, or even woven composites based on carbon fibers.

According to the present invention, the nanofiltration unit is chosen so that the membrane's cut-off threshold is more than the molecular weight of the components of the buffer agent used in the reversal bath. Nanofiltration membranes that are useful according to the invention will have a cut-off threshold between 100 and 1000 daltons, preferably between 150 and 500 daltons. Nanofiltration membranes that are useful according to the invention have advantageously during the processing period, a tin retention rate (II) of at least 0.9. This will enable pollution of the first washing bath to be prevented when its water level is maintained by the waters from the reversal bath which are recirculated after they have been passed through the nanofiltration unit. In order to maintain such a retention rate, the treatment flow and applied pressure are chosen appropriately according to the nanofiltration device. Preferably, the applied pressure varies between 5 and 40 bars and preferably between 10 and 20 bars.

Examples of nanofiltration membranes useful according to the invention, are the NF45 FILMTEC® membranes, and the NF70 FELMTEC® membranes sold by Dow Europe Separation Systems®, or the Osmonics DK® membranes, the Osmonics MX® membranes, and the Osmonics SV® membranes sold by the Osmonics company.

A general appreciation of the processing method of the invention can be obtained by reference to FIG. 1 that schematically represents a preferred embodiment of a device to implement the method of the invention.

The film to be developed (not shown) is circulated through successively a black and white development bath (1), then through a first washing bath (2), then through a reversal bath (3), which usually contains a tin II (stannous) salt, and at least a buffer agent capable to go through a nanofiltration membrane. The film then goes through a color development bath (4), through a conditioning bath (5), through a bleaching bath (6), through a fixing bath (7), through a final washing zone comprising baths (8) and (9), and finally through a rinsing bath (10). The levels of the washing baths (8) and (9) are maintained by countercurrents (18). The replenishment circuit of baths (1), (3), (4), (5), (6), (7) and (10) are not shown. The final rinsing bath (10) contains conventional ingredients such as surfactants. The first washing bath (2), initially filled with clean water, has a water level that is maintained by a counter-current (17) coming from an auxiliary source (12) by means of a pump (24). This auxiliary source is supplied by the permeate (21) coming from a nanofiltration unit (13). The water level of this auxiliary source (12) can also be maintained by the addition of clean water in order to maintain a constant renewal flow rate for the first washing bath (2). To prevent overflow of the first washing bath tank and enable the recycling of its wastewater, an overflow device (16) enables evacuation of the wastewater to a tank (11). The wastewater of the reversal bath (3) and the first washing bath (2) are collected into a tank (11), either by means of the overflows (16), or by means of drain valves (14). From the tank (11), the collected wastewater is taken through a nanofiltration membrane device (13) by opening the valve (20) and using a high-pressure pump (15). The retentate (22) from the nanofiltration device (13) can be either evacuated from the circuit, for example to an auxiliary treatment device (not shown), or recycled in the tank (11). The permeate (21) can supply either an auxiliary source (12) (option shown on the diagram), or directly the first washing bath (2) (option not shown on the diagram). Parts (not shown) can be added, such as, for example, conductivity meter measuring devices for the concentrations of the chemical species of the solution in the tank (11), with servo control enabling evacuation of part of the contents of this tank when these concentrations reach or exceed a certain limit, to an auxiliary treatment unit (23). For example, a valve (19) can be provided to enable this evacuation. The changes of the pH can also be monitored in buffer tank (11) by conventional techniques for example with a pH-meter. This embodiment is particularly advantageous because it enables significant reduction of the water consumption of the first washing bath, maintenance of the pH of the first washing bath and all without deterioration of the sensitometric characteristics of the developed films.

The invention is described in detail in the following examples.

EXAMPLES

Example 1

A Noritsu QSF-R4103 E6 minilab sold by the Noritsu company was used. In order to season the baths, the minilab was used to develop exposed films, KODAK ELITECHROME 100® (10 rolls/day for three days) and KODAK EKTACHROME Plus® (10 rolls/day for three days), using the Ektachrome E-6® process. The minilab used the following sequence (with reference to FIG. 1):

| E-6 baths | Time | Temperature ° C. | Service rate |
|---|---|---|---|
| First development (1) | 6 m | 38 | 2150 ml/m$^2$ |
| First wash (2) | 2 m 30 s | 35 | Exp. 1<br>1 1/m<br>Exp. 2<br>10 ml/m$^2$ |
| Reversal bath (3) | 2 m 30 s | 38 | 1075 ml/m$^2$ |
| Color development (4) | 6 m | 38 | 2150 ml/m$^2$ |
| Conditioner (5) | 2 m 30 s | 38 | 1075 ml/m$^2$ |
| Bleaching (6) | 6 m | 40 | 230 ml/m$^2$ |
| Fixing (7) | 2 m 30 s | 38 | 1075 ml/m$^2$ |
| Final wash (8) | 2 m 30 s | 37–38 | back-flow |
| Final wash (9) | 2 m 30 s | 37–38 | back-flow |
| Rinsing (10) | 2 m 30 s | 30–34 | 2150 ml/m$^2$ |

The water levels of the washing baths (8) and (9) were maintained by a back-flow coming from the rinsing bath (10). The final rinsing bath (10) contained the conventional adjuvants for an Ektachrome E-6® type rinsing. Then, the operation was continued conventionally by drying (temperature>67° C.). In experiment 1, the renewal rate for the first washing bath (2) was 1 l/min (standard), while in the experiment 2 (comparison), it was only 10 ml/min.

For experiments 1 and 2, the potassium monosulfonate hydroquinone concentration (KHQS used as black and white developing agent in the first development (1)) was measured by high pressure liquid chromatography (HPLC). The change of the tin concentration (II) in the reversal bath (3) was measured by capillary zone electrophoresis (CZE) and inductive coupling plasma—optical emission spectroscopy (ICP-AES). The pH change in the first washing bath was also measured.

The results are given in Table 1.

TABLE 1

| | Experiment 1 (standard) | | | Experiment 2 (comparison) | | |
|---|---|---|---|---|---|---|
| | First washing | Reversal bath (3) | | First washing | Reversal bath (3) | |
| | bath (2) pH | [KHQS] mg/l | [(Sn (II)] g/l | bath (2) pH | [KHQS] mg/l | [Sn (II)] g/l |
| Day one | 6.86 | 0 | 1.25 | 6.86 | 0 | 1.35 |
| Day two | 6.86 | 0 | 1.25 | 7.32 | 9 | 1.25 |
| Day three | 6.86 | 0 | 1.25 | 9.26 | 17 | 0.95 |

It may be noted that when a low rate of replenishment was used for the first washing bath (2) (10 ml/min, experiment 2) instead of the standard rate (1 l/min, experiment 1), the pH increases very clearly. In addition, the tin concentration (II) in the reversal bath lowers clearly to reach from day three a value below the tolerance limit threshold. This phenomenon is probably linked to the pollution of the reversal bath by the chemical components of the first developer (KHQS) carried-over either by means of the photographic material, or by the conveyor belts of the photographic product.

Monitoring of the processing quality is carried out daily, using control strips, catalogued under the name "Kodak Control Strips, Process E-6 (emulsion 9041)" supplied by the KODAK company. These pre-exposed control strips are developed. Then, using a densitometer, the densities of the red, green and blue colors are read at various exposures to determine the quality level of the development process.

The following densities are read:

the maximum density (Dmax) corresponding to the density of an unexposed zone, the minimum density (Dmin) represented by the density at an exposure of 1.6 Log E above the exposure giving a density 0.8.

the high density (HD) used to assess the color balance,—the low density (LD) used to assess the speed.

The control strip measurements are then compared with a reference, representing the optimum functioning characteristics for an Ektachrome E-6® processing, and the measured deviation for each density of each color is recorded.

These control strips are used according to the manual "Process E-6 using Kodak chemicals", Chapter 13, N○Z-119 published by Kodak (October 1997).

The tolerance limits for an E-6 processing are as follows:

Dmin: (+) 0.05

LD: (+–) 0.10

HD: (+–) 0.15

Dmax: (–) 0.25

The maximum variations (Vmax) represent the difference of the maximum density (in absolute value) between the three color measurements. Vmax thus represents the dispersion recorded for each parameter in the three colors. Therefore one seeks to obtain a very low value for Vmax in order to maintain the balance of each characteristic for the three colors. The recommended acceptable tolerance limits for Vmax with an E-6 processing are the following:

for LD (speed), Vmax<0.07, for HD (color), Vmax<0.11.

The results are given in Tables 2 and 3. The asterisks indicate that they are outside the tolerance limits recommended for an E-6 processing.

TABLE 2

Change of processing quality for experiment 1 (standard)

| | Dmax | HD | LD | Dmin | Sensitometric quality within tolerance area |
|---|---|---|---|---|---|
| Day one | | | | | |
| Red | 0.05 | 0.02 | 0.02 | 0.00 | Yes |
| Green | 0.02 | 0.04 | 0.03 | 0.00 | |
| Blue | 0.00 | −0.04 | 0.02 | 0.01 | |
| Vmax | 0.05 | 0.08 | 0.01 | 0.01 | |
| Day two | | | | | |
| Red | 0.05 | 0.02 | 0.02 | 0.00 | Yes |
| Green | 0.02 | 0.04 | 0.03 | 0.00 | |
| Blue | 0.00 | −0.04 | 0.02 | 0.01 | |
| Vmax | 0.05 | 0.08 | 0.01 | 0.01 | |
| Day three | | | | | |
| Red | 0.04 | 0.01 | 0.01 | 0.01 | Yes |
| Green | 0.02 | 0.02 | 0.02 | 0.00 | |
| Blue | 0.04 | −0.03 | 0.02 | 0.01 | |
| Vmax | 0.02 | 0.05 | 0.01 | 0.01 | |

Note that for a standard processing (rate of renewal of the first washing bath = 1 l/min) the tolerance limits were not exceeded.

TABLE 3

Change of processing quality for experiment 2 (comparison)

| | Dmax | HD | LD | Dmin | Sensitometric quality within tolerance area |
|---|---|---|---|---|---|
| Day one | | | | | |
| Red | 0.08 | 0.02 | 0.02 | 0.01 | Yes |
| Green | 0.06 | 0.04 | 0.03 | 0.00 | |
| Blue | 0.02 | −0.03 | 0.03 | 0.02 | |
| Vmax | 0.06 | 0.07 | 0.01 | 0.02 | |
| Day two | | | | | |
| Red | 0.03 | 0.02 | 0.03 | 0.02 | No |
| Green | 0.02 | 0.05 | 0.06* | 0.01 | |
| Blue | 0.06 | 0.02 | 0.08* | 0.01 | |
| Vmax | 0.04 | 0.03 | 0.05 | 0.01 | |
| Day three | | | | | |
| Red | 0.04 | 0.02 | 0.03 | 0.02 | No |
| Green | 0.00 | 0.03 | 0.04 | 0.01 | |
| Blue | 0.03 | 0.00 | 0.06* | 0.00 | |
| Vmax | 0.04 | 0.03 | 0.03 | 0.02 | |

Note that when the renewal rate of the first washing bath was reduced (10 ml/min, experiment 2, comparison), a harmful impact was seen on the sensitometric quality of the developed films from day two.

Example 2

Two seasoned reversal baths (2×5 liters) of an E-6 Kodak Professional processing (buffer agent acetic acid/sodium acetate) and an E-6 Kodak processing (buffer agent propionic acid/sodium propionate), were treated using a nanofiltration membrane NF45 FILMTEC® with a specific treatment surface area 2.21 $m^2$, sold by Dow Europe Separation Systems®, with a supply flow rate of 600 l/h at a pressure of 20 bars. For these two seasoned reversal baths, the retention rates of the membrane were determined for tin (II), propionate (for the E-6 Kodak reversal bath only), acetate (for the E-6 Kodak Professional reversal bath only) and salt pentasodic aminotri[methylenephosphonic acid], more commonly called Dequest 2006. The retention rate (TR) for a membrane is defined by the equation: $TR=1-(C_p/C_r)$ where $C_r$ is the concentration of the species to be retained in the retentate and $C_p$ is the concentration of the same species in the permeate.

The results are given in Table 4.

TABLE 4

| | TR for E-6 Kodak Professional reversal bath | TR for E-6 Kodak reversal bath |
|---|---|---|
| Sn (II) | 1.00 | 1.00 |
| Dequest 2006 | 1.00 | 1.00 |
| Acetate | 0.10 | Not present in the formulation |
| Propionate | Not present in the formulation | 0.12 |

As can be seen, the nanofiltration membrane used has a low retention rate for the buffer agent thus enabling it to be recycled in the permeate while retaining the other chemical species.

Example 3

The minilab was used according to the sequence described in experiment 2 of example 1, which corresponds to a configuration of the minilab with a low rate of renewal for the first washing bath (2) (10 ml/min). Exposed films were developed in this minilab, KODAK ELITECHROME 100® (10 rolls/day) and KODAK EKTACHROME Plus® (10 rolls/day), using the Ektachrome E-6® process. The water from the reversal bath (3) and the first washing bath (2), using the overflow when the minilab was operating, as well as the water from the daily draining of the first washing bath (2), were collected in a buffer tank (11).

The waters from this buffer tank (11) were treated daily using a filtration membrane NF45 FILMTEC® marketed by Dow Europe Separation Systems®, with a supply flow rate of 600 l/h at a pressure of 10 bars. The membrane's cut-off threshold is 200 g/mole. The recycling rate of the collected water was 97–98%. The permeate was collected in a bath used as an auxiliary source (12) so that the water volume of the first washing bath and the water supply of the first washing bath (2) were topped up with a renewal rate of 10 ml/min. The experiment ran for a period of ten days. The sensitometric quality was checked according to the procedure described in example 1. The results are given in Table 5. The daily measurements of pH of the first washing bath (2) show that it was kept within the range 6.30–6.75 for the whole period of the experiment.

TABLE 5

Change of processing quality (invention)

| | Dmax | HD | LD | Dmin | Sensitometric quality within tolerance area |
|---|---|---|---|---|---|
| Day one | | | | | |
| Red | 0.01 | −0.03 | −0.02 | 0.01 | Yes |
| Green | −0.07 | −0.09 | −0.03 | 0.02 | |
| Blue | −0.07 | −0.08 | 0.00 | 0.00 | |
| Vmax | 0.08 | 0.06 | 0.03 | 0.02 | |
| Day two | | | | | |
| Red | 0.03 | −0.01 | 0.00 | 0.02 | Yes |
| Green | −0.04 | −0.05 | −0.01 | 0.02 | |
| Blue | −0.09 | −0.07 | −0.01 | −0.01 | |
| Vmax | 0.12 | 0.06 | 0.01 | 0.03 | |
| Day three | | | | | |
| Red | 0.04 | −0.01 | −0.01 | 0.02 | Yes |
| Green | 0.00 | −0.02 | 0.00 | 0.02 | |
| Blue | −0.10 | −0.07 | −0.01 | −0.01 | |
| Vmax | 0.14 | 0.06 | 0.01 | 0.03 | |
| Day four | | | | | |
| Red | 0.06 | 0.01 | −0.01 | 0.01 | Yes |
| Green | 0.02 | −0.01 | 0.00 | 0.02 | |
| Blue | −0.12 | −0.08 | −0.01 | 0.00 | |
| Vmax | 0.18 | 0.09 | 0.01 | 0.02 | |
| Day five | | | | | |
| Red | 0.07 | 0.01 | −0.01 | 0.02 | Yes |
| Green | 0.05 | 0.02 | 0.01 | 0.02 | |
| Blue | −0.08 | −0.08 | −0.02 | 0.00 | |
| Vmax | 0.15 | 0.10 | 0.03 | 0.02 | |
| Day six | | | | | |
| Red | 0.08 | 0.02 | 0.00 | 0.01 | Yes |
| Green | 0.03 | 0.00 | 0.01 | 0.02 | |
| Blue | −0.09 | −0.08 | 0.00 | 0.00 | |
| Vmax | 0.17 | 0.10 | 0.01 | 0.02 | |
| Day seven | | | | | |
| Red | 0.04 | −0.02 | −0.01 | 0.01 | Yes |
| Green | −0.01 | −0.01 | −0.02 | 0.02 | |
| Blue | −0.11 | −0.11 | −0.02 | 0.00 | |
| Vmax | 0.15 | 0.10 | 0.01 | 0.02 | |
| Day eight | | | | | |
| Red | 0.02 | −0.01 | −0.01 | 0.01 | Yes |
| Green | −0.08 | −0.08 | −0.03 | 0.02 | |
| Blue | −0.12 | −0.07 | −0.01 | 0.00 | |

TABLE 5-continued

Change of processing quality (invention)

| | Dmax | HD | LD | Dmin | Sensitometric quality within tolerance area |
|---|---|---|---|---|---|
| Vmax | 0.14 | 0.07 | 0.02 | 0.02 | |
| Day nine | | | | | |
| Red | 0.08 | 0.03 | 0.01 | 0.01 | Yes |
| Green | 0.01 | −0.01 | 0.01 | 0.01 | |
| Blue | −0.06 | −0.05 | 0.00 | 0.00 | |
| Vmax | 0.14 | 0.08 | 0.01 | 0.01 | |
| Day ten | | | | | |
| Red | 0.05 | 0.00 | 0.00 | 0.01 | Yes |
| Green | −0.01 | −0.04 | −0.01 | 0.01 | |
| Blue | −0.11 | −0.09 | −0.01 | 0.00 | |
| Vmax | 0.16 | 0.09 | 0.01 | 0.01 | |

It may be noted that the invention enables a good sensitometric quality of developed films to be kept while reducing the renewal rate of the first washing bath from 1 l/min to 10 ml/min. Thus water consumption of the first washing bath (2) is reduced by a factor of 100.

What is claimed is:

1. A method of processing an exposed color reversal photographic film comprising the steps of circulating the exposed film successively in:

i) a black and white development bath, ii) a first washing bath, iii) a reversal bath comprising at least a buffer agent liable to pass through a nanofiltration membrane, this method comprising further the steps of collecting the waters leaving the reversal bath, circulating the collected waters through a nanofiltration unit to produce a permeate, recycling the permeate in said first washing bath and rejecting via an overflow a water volume at least equivalent to that supplied by the permeate, the buffer agent being chosen so as to keep the pH in the first washing bath between 5 and 7.

2. The method of claim 1 wherein the reversal bath contains a tin salt (II).

3. The method of claim 1 wherein the waters leaving the reversal bath are collected by draining and/or an overflow.

4. The method of claim 1 comprising further the steps of collecting the waters leaving the first washing bath, passing these collected waters through a nanofiltration unit to produce a permeate, recycling this permeate in the first washing bath and rejecting via the overflow a water volume at least equivalent to that supplied by the permeate.

5. The method of claim 1 wherein the buffer agent comprises a weak acid and its conjugated base.

6. The method of claim 1 wherein the buffer agent is either the combination, acetic acid/sodium acetate or the combination propionic acid/sodium propionate.

* * * * *